US009456590B2

(12) United States Patent
Ogawa et al.

(10) Patent No.: US 9,456,590 B2
(45) Date of Patent: Oct. 4, 2016

(54) AMORPHOUS ALLOY HOOKS AND METHODS OF MAKING SUCH HOOKS

(75) Inventors: Dennis Ogawa, Rancho Santa Margarita, CA (US); Quoc Tran Pham, Anaheim, CA (US); Atakan Peker, Aliso Viejo, CA (US)

(73) Assignee: CRUCIBLE INTELLECTUAL PROPERTY, LLC, Rancho Santa Margarita, CA (US)

( * ) Notice: Subject to any disclaimer, the term of this patent is extended or adjusted under 35 U.S.C. 154(b) by 0 days.

(21) Appl. No.: 13/494,804

(22) Filed: Jun. 12, 2012

(65) Prior Publication Data

US 2012/0247622 A1    Oct. 4, 2012

Related U.S. Application Data

(62) Division of application No. 11/577,081, filed as application No. PCT/US2005/038474 on Oct. 24, 2005, now Pat. No. 8,197,615.

(60) Provisional application No. 60/621,486, filed on Oct. 22, 2004.

(51) Int. Cl.
*A01K 83/00* (2006.01)
*C22C 45/00* (2006.01)
*C22C 45/02* (2006.01)
*C22C 45/10* (2006.01)

(52) U.S. Cl.
CPC ............... *A01K 83/00* (2013.01); *C22C 45/00* (2013.01); *C22C 45/02* (2013.01); *C22C 45/10* (2013.01)

(58) Field of Classification Search
CPC ............ A63C 5/00; A63C 5/12; C22C 45/02

USPC ................................ 43/43.16; 148/403, 538
See application file for complete search history.

(56) References Cited

U.S. PATENT DOCUMENTS

| | | | | |
|---|---|---|---|---|
| 3,861,699 | A | * | 1/1975 | Molnar ........................ 280/610 |
| 5,222,321 | A | | 6/1993 | Lu |
| 5,288,344 | A | | 2/1994 | Peker et al. |
| 5,368,659 | A | | 11/1994 | Peker |
| 5,618,359 | A | | 4/1997 | Lin |
| 5,678,636 | A | * | 10/1997 | Preiss .............................. 168/4 |
| 5,735,975 | A | | 4/1998 | Lin |
| 5,772,803 | A | | 6/1998 | Peker et al. |
| 5,896,642 | A | | 4/1999 | Peker et al. |

(Continued)

FOREIGN PATENT DOCUMENTS

| | | |
|---|---|---|
| JP | 2001-303218 | 10/2001 |
| WO | 9720601 | 6/1997 |
| WO | 2004092428 | 10/2004 |

OTHER PUBLICATIONS

Anderson, "Fishing hook's rocket science," Tackle Trade World, Nov. 2005, p. 24.

(Continued)

*Primary Examiner* — Alexander Polyansky
(74) *Attorney, Agent, or Firm* — Brownstein Hyatt Farber Schreck, LLP

(57) ABSTRACT

Mechanical hooks made of bulk-solidifying amorphous alloys, wherein the bulk-solidifying amorphous alloys provide ruggedness, durability, higher service loads, excellent resistance to chemical and environmental effects, and low-cost manufacturing are provided. In addition, methods of making such mechanical hooks from bulk-solidifying amorphous alloys are also disclosed.

21 Claims, 1 Drawing Sheet

(56) References Cited

U.S. PATENT DOCUMENTS

| | | |
|---|---|---|
| 6,325,868 B1 | 12/2001 | Kim |
| 6,685,577 B1 | 2/2004 | Scruggs et al. |
| 2002/0130489 A1* | 9/2002 | Peker et al. ................ 280/610 |
| 2002/0142182 A1 | 10/2002 | Peker |
| 2006/0123690 A1 | 6/2006 | Anderson |
| 2006/0260782 A1* | 11/2006 | Johnson .................. 164/463 |

OTHER PUBLICATIONS

International Search Report mailed Mar. 13, 2006, for PCT/US05/38474.

Noue et al., "Bulk amorphous alloys with high mechanical strength and good soft magnetic properties in Fe—Tm—B (TM=IV-VIII group transition metal) system", Appl. Phys. Lett., vol. 71, p. 464 (1997).

Shen et al., "Bulk Glassy CO43FE20TA5.5B31.5 Alloy with High Glass-Forming Ability and Good Soft Magnetic Properties", Materials Transactions, vol. 42 No. 10 (2001).

Hays et al., "Microstructure Controlled Shear Band Pattern Formation and Enhanced Plasticity of Bulk Metallic Glasses Containing in situ Formed Ductile Phase Dendrite Dispersions," Physical Review Letters, Mar. 27, 2000, vol. 84, No. 13, The American Physical Society.

* cited by examiner

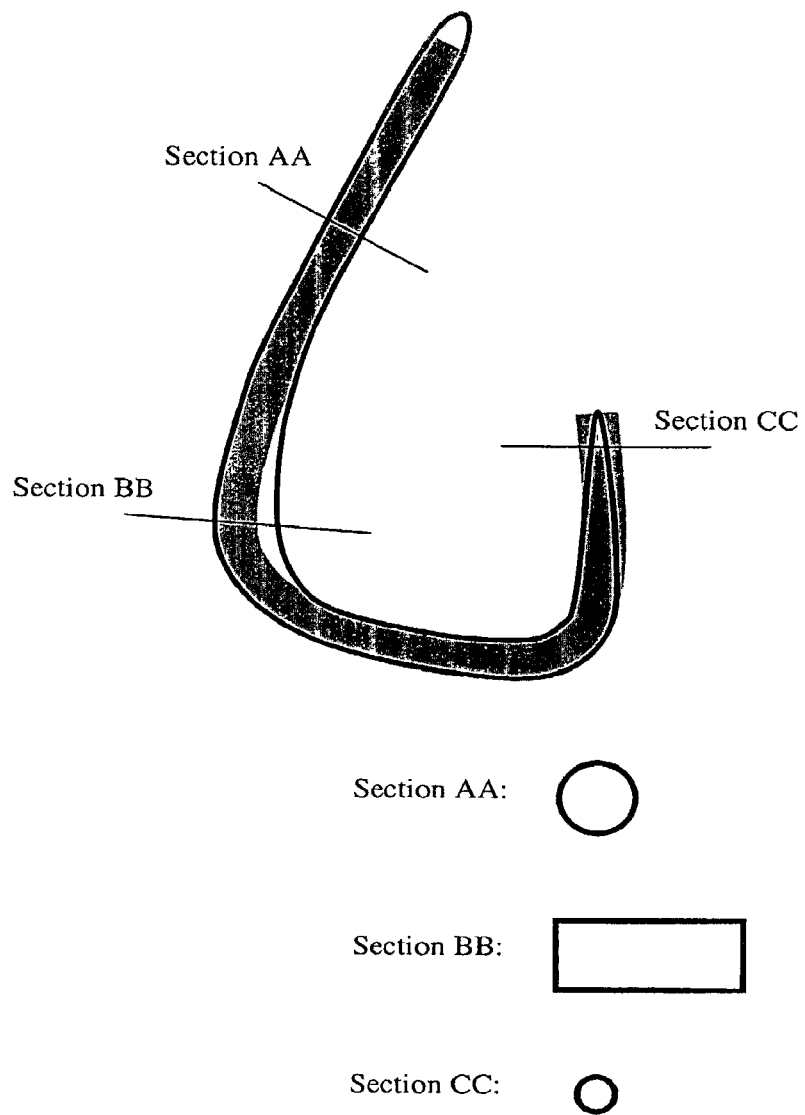

AMORPHOUS ALLOY HOOKS AND METHODS OF MAKING SUCH HOOKS

CROSS REFERENCE TO RELATED APPLICATIONS

This is a divisional application of U.S. application Ser. No. 11/577,081 now U.S. Pat. No. 8,197,615, filed Jan. 5, 2009, which is a U.S. National Phase of PCT/US05/38474, filed Oct. 24, 2005, which claims priority from U.S. Provisional Application Ser. No. 60/621,486, filed Oct. 22, 2004, all of which are hereby incorporated herein by reference in their entirety.

FIELD OF THE INVENTION

The present invention is directed mechanical hooks made of bulk solidifying amorphous alloys and method of making such mechanical hooks.

BACKGROUND OF THE INVENTION

Mechanical hooks are mechanical tools, which are designed to transmit loads concentrated to a relatively small area. Also, mechanical hooks are used to carry bulky objects by hanging on a small portion of such objects. Mechanical hooks may take several shapes and design forms. In one common form, they have a relatively large open loop on one end and a smaller closed loop on the other end connected with a relatively straight portion. The larger open loop is used to carry or hang on the bulky object and the smaller closed loop is used to transmit the load to the desired mechanism or other load bearing structures. One example of such a mechanical hook is a fishhook.

A critical aspect of the mechanical loop is its load carrying capacity and its ability to retain its structural shape and durability when subjected to such loads. For example, in the case of fishhook, the open loop needs to retain its shape without substantially opening, which otherwise may lead to dropping the caught fish.

In certain hook designs, the shape of the open (or closed loop) may have precise forms, such as a sharpened tip with certain conical angles, such as ones common in fishhooks. The durability and preservation of these critical shapes may become important in ensuring that it serve its intended function. Accordingly, the application of loads to the hook should not lead to a degradation of such design features whether in the form of substantial elastic or plastic deformation. As a result, it is desirable that mechanical hooks have very high strength characteristics to resist such substantial deformations.

Mechanical hooks are also frequently used in various corrosive environments, such as the marine environment, as in the case of a fishhook, and as such they should be corrosion resistant and preferably should preclude any galvanic corrosion with other materials they come into contact with.

Mechanical hooks, such as fishhooks, are commonly made by a method which utilizes a standard wire product as feedstock input material. The feedstock wire material is then subsequently subjected to several progressive forming operations, such as bending, forging, machining, grinding etc, which leads to the final form. Although, the wire feedstock alloy can provide a high strength alloy, its initial form severely limits the design flexibility, such as the form of cross section of the hook. Therefore, the beneficial use of geometric effects for high load carrying capacities cannot be utilized. Although, various casting processes can be utilized to make mechanical hooks, the availability of high strength alloys are limited, and the cast hooks are generally considered to be of inferior quality.

Accordingly, a need exists for a novel material in the use of mechanical hooks and methods of making such hooks that provides high strength, design flexibility and low cost manufacturing.

SUMMARY OF THE INVENTION

The present invention is directed to mechanical hooks made of a bulk solidifying amorphous alloy.

In another embodiment of the invention, the mechanical hook is a fishhook.

In yet another embodiment of the invention, the mechanical hook comprises an open loop In still yet another embodiment of the invention, the mechanical hook comprises a closed loop.

In still yet another embodiment of the invention, the open loop of the mechanical hook comprises a sharpened tip.

In still yet another embodiment of the invention, the mechanical hoop comprises a varying cross-section.

In still yet another embodiment of the invention, the amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages In still yet another embodiment of the invention, the amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

In still yet another embodiment of the invention, the amorphous alloy can sustain strains up to 1.5% or more without any permanent deformation or breakage.

In still yet another embodiment of the invention, the bulk solidifying amorphous alloy has a high fracture toughness of at least 20 ksi-in$^{0.5}$.

In still yet another embodiment of the invention, the bulk solidifying amorphous alloy has a $\Delta T$ of 60° C. or greater.

In still yet another embodiment of the invention, the bulk solidifying amorphous has a hardness of 7.5 Gpa and higher.

In another alternative embodiment, the invention is also directed to methods of manufacturing mechanical hooks from bulk-solidifying amorphous alloys.

BRIEF DESCRIPTION OF THE DRAWINGS

The following invention will be better understood with reference to following figures, which provide non-limiting exemplary embodiments of mechanical hooks, wherein:

FIG. 1 provides a FIGURE of an exemplary mechanical hook having a varying cross-section in accordance with the current invention, as shown in cross-sections AA, BB, and CC.

DESCRIPTION OF THE INVENTION

The current invention is directed to mechanical hooks made of bulk-solidifying amorphous alloys, the bulk-solidifying amorphous alloys providing ruggedness, durability, higher service loads, excellent resistance to chemical and environmental effects, and low-cost manufacturing for mechanical hooks with high precision design features.

Another object of the current invention is a method of making mechanical hooks from such bulk-solidifying amorphous alloys.

Bulk solidifying amorphous alloys are a recently discovered family of amorphous alloys, which can be cooled at substantially lower cooling rates, of about 500 K/sec or less, and substantially retain their amorphous atomic structure. As such, they can be produced in thicknesses of 1.0 mm or more, substantially thicker than conventional amorphous alloys, which are typically limited to thicknesses of 0.020 mm, and which require cooling rates of $10^5$ K/sec or more. U.S. Pat. Nos. 5,288,344; 5,368,659; 5,618,359; and 5,735, 975, the disclosures of which are incorporated herein by reference in their entirety, disclose such bulk solidifying amorphous alloys.

A family of bulk solidifying amorphous alloys can be described as $(Zr, Ti)_a(Ni, Cu, Fe)_b(Be, Al, Si, 13)_c$, where a is in the range of from 30 to 75, b is in the range of from 5 to 60, and c is in the range of from 0 to 50 in atomic percentages. Furthermore, these basic alloys can accommodate substantial amounts (up to 20% atomic, and more) of other transition metals, such as Nb, Cr, V, Co. A preferable alloy family is $(Zr, Ti)_a(Ni, Cu)_b(Be)_c$, where a is in the range of from 40 to 75, b is in the range of from 5 to 50, and c is in the range of from 5 to 50 in atomic percentages. Still, a more preferable composition is $(Zr, Ti)_a(Ni, Cu)_b(Be)_c$, where a is in the range of from 45 to 65, b is in the range of from 7.5 to 35, and c is in the range of from 10 to 37.5 in atomic percentages. Another preferable alloy family is $(Zr)_a(Nb, Ti)_b(Ni, Cu)_c(Al)_d$, where a is in the range of from 45 to 65, b is in the range of from 0 to 10, c is in the range of from 20 to 40, and d is in the range of from 7.5 to 15 in atomic percentages.

Another set of bulk-solidifying amorphous alloys are ferrous metals (Fe, Ni, Co) based compositions. Examples of such compositions are disclosed in U.S. Pat. No. 6,325, 868 and in publications to (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can still be processed in thicknesses of 1.0 mm or more, sufficient enough to be utilized in the current invention.

Bulk-solidifying amorphous alloys have typically high strength and high hardness. For example, Zr and Ti-base amorphous alloys typically have yield strengths of 250 ksi or higher and hardness values of 450 Vickers or higher. The ferrous-base version of these alloys can have yield strengths up to 500 ksi or higher and hardness values of 1000 Vickers and higher. As such, these alloys display excellent strength-to-weight ratio especially in the case of Ti-base and Fe-base alloys. Furthermore, bulk-solidifying amorphous alloys have good corrosion resistance and environmental durability, especially the Zr and Ti based alloys. Amorphous alloys generally have high elastic strain limit approaching up to 2.0%, much higher than any other metallic alloy.

In general, crystalline precipitates in bulk amorphous alloys are highly detrimental to the properties of amorphous alloys, especially to the toughness and strength of these alloys, and as such it is generally preferred to minimize the volume fraction of these precipitates. However, there are cases in which, ductile crystalline phases precipitate in-situ during the processing of bulk amorphous alloys, which are indeed beneficial to the properties of bulk amorphous alloys, especially to the toughness and ductility of the alloys. Such bulk amorphous alloys comprising such beneficial precipitates are also included in the current invention. One exemplary case is disclosed in (C. C. Hays et. al, Physical Review Letters, Vol. 84, p 2901, 2000), which is incorporated herein by reference.

As a result of the use of these bulk-solidifying amorphous alloys, the mechanical hooks of the present invention have characteristics that are much improved over conventional mechanical hooks made of ordinary metallic materials. The surprising and novel advantages of using bulk-solidifying amorphous alloys in producing metallic mechanical hooks will be described in various embodiments below.

First, the unique amorphous atomic structure of the bulk solidifying amorphous alloys provide a high strength microstructure, which can be readily achieved with a near-to-net shape casting operation. The general obstacles to high precision design features, which employ geometric effects to improve the load carrying ability, are not applicable in conventionally manufactured hooks, such as those that use a wire feedstock. It has been unexpectedly discovered that mechanical hooks made of bulk solidifying amorphous alloys can be net-shape cast with high precision design features, which can allow the use of various geometric effects—such as changing the form of cross section—which in turn substantially increases the load carrying ability of such hooks. Initial trials of fishhooks made of bulk solidifying amorphous alloys further demonstrate that these fishhooks function much more reliably by preserving their shapes under loads than their counterparts made using conventional alloys Secondly, the combination of high strength and high elastic limit of the bulk solidifying amorphous alloys increases the durability, and especially allows for the preservation of high precision design features, such as the sharpened tips, in the fishhooks. Furthermore, these characteristics allow for a reduction in the thickness around the engagement portion of the hook, and thereby increases the effectiveness of the hook in catching and engaging a load. For example, in the case of fishhooks, a thinner and more durable tip allows a much more effective capture of a fish by penetrating into the narrow channels in the fish's bone structure. The ability to fabricate metallic mechanical hooks with thinner cross sections is also important in reducing the bulkiness of the mechanical hook system and in increasing the efficiency per-volume of the mechanical hook system. This increased efficiency is particularly useful for the application of mechanical hook systems in retrieving and storage.

In addition, mechanical hooks made of bulk solidifying amorphous alloy also have good corrosion resistance and high inertness. The high corrosion resistance and inertness of these materials are useful for preventing the mechanical hooks from being decayed by undesired chemical reactions between the mechanical hook and the environment of the mechanical hook system. The inertness of bulk solidifying amorphous alloys is also very important to the life of the mechanical hook system because it does not tend to decay the retrieving and storage equipment by causing galvanic corrosion to those systems.

Another aspect of the invention is the ability to make mechanical hooks with isotropic characteristics. Generally, non-isotropy in mechanical hooks causes degraded performance as mechanical hooks are subjected to mechanical forces with a variety of geometries, such as twisting and torsion. The non-uniform response of ordinary metals in these various directions also requires extensive design margins to compensate, and as such results in a less efficient design. Accordingly, the isotropic response of the mechanical hooks in accordance with the present invention is beneficial, at least in certain designs, and the associated need to have a high strength construction. For example, the castings of ordinary alloys are typically poor in mechanical strength and are distorted in the case of long shapes and at smaller thickness. Accordingly, using ordinary metallic alloys for casting such shapes with high tolerance in flatness (or precisely curved shapes) is not generally feasible. In addition, for ordinary metallic alloys, extensive rolling and drawing operations would be needed to produce the mechanical hook from the wrought material feedstock with the desired precision and with the desired high strength. However, products of ordinary high-strength alloys made in accordance to such standard techniques generate strong orientations, and, as such, lack the desirable isotropic properties. Indeed, such forming operations typically result in highly oriented and elongated crystalline grain structures in the metallic alloys resulting in highly non-isotropic materials. In contrast, bulk-solidifying amorphous alloys, due to their unique atomic structure, lack any microstructure as observed in crystalline and grainy metal, and as a result, articles formed from such alloys are inherently isotropic.

Another object of the invention is providing a method to produce mechanical hooks in net-shape form from bulk solidifying amorphous alloys. By producing mechanical hooks in net-shape form manufacturing costs can be significantly reduced while still forming metallic mechanical hooks with advanced design features comprising precision curves and varying cross-sections providing beneficial geometric stiffening effects. Such beneficial geometric effects can not be readily utilized in the conventional hook manufacturing process such as those using bending of wire feedstock. An example of this can be illustrated with the aid of FIG. 1, which schematically depicts a general form of a generic hook. In conventional hooks (as shown by the grey shaded area in FIG. 1), the cross-sectional areas (e.g., section AA, section BB and section CC) and its shape is relatively uniform and can not be changed without substantial costs during manufacturing. As such, the beneficial effects can not be readily utilized. In this example of the hook made of bulk solidifying amorphous alloys (as shown by the dark outline in FIG. 1), the section AA can be a circular cross-section with an cross-sectional area of M, then the section BB can be a rectangular cross-sectional, with a cross-sectional area of N such that N>2M, and then the section CC can be again a circular cross-sectional with a cross-sectional area Q such that Q<0.5M. Herein, the values 2 and 0.5 are given for the purposes of illustration and is not the limitation of the current invention. The relative of cross sectional areas can be substantially larger than the values used in this example. Furthermore, the shape and cross-section can be adjusted to increase the Second Moment (I) of the cross section to increase the resistance of section to bending during loading. The optimized specifics of such design features can be determined by using standard techniques of mechanics and FEA (Finite Element Analysis) and then can be readily implemented into the net-shape manufacturing process of bulk-solidifying amorphous alloys.

One exemplary method of making such metallic mechanical hooks comprises the following steps:

1) Providing a wire feedstock of an amorphous alloy being substantially amorphous, and having an elastic strain limit of about 1.5% or greater and having a $\Delta T$ of 30° C. or greater;

2) Heating the feedstock to around the glass transition temperature;

3) Shaping the heated feedstock into the desired shape; and

4) Cooling the formed sheet to temperatures far below the glass transition temperature.

Herein, $\Delta T$ is given by the difference between the onset of crystallization temperature, $T_x$, and the onset of glass transition temperature, $T_g$, as determined from standard DSC (Differential Scanning calorimetry) measurements at typical heating rates (e.g. 20° C./min).

Preferably $\Delta T$ of the provided amorphous alloy is greater than 60° C., and most preferably greater than 90° C. The provided feedstock can have about the same thickness as the average thickness of the final mechanical hook. Moreover, the time and temperature of the heating and shaping operation is selected such that the elastic strain limit of the amorphous alloy is substantially preserved to be not less than 1.0%, and preferably not being less than 1.5%. In the context of the invention, temperatures around glass transition means the forming temperatures can be below glass transition, at or around glass transition, and above glass transition temperature, but always at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Upon finishing the above-mentioned fabrication method, the shaped metallic mechanical hook can be subjected further surface treatment operations as desired such as to remove any oxides on the surface. Chemical etching, grinding, polishing can also be utilized.

Another exemplary method of making metallic mechanical hooks in accordance with the present invention comprises the following steps:

1) Providing a homogeneous alloy feedstock of amorphous alloy (not necessarily amorphous);

2) Heating the feedstock to a casting temperature above the melting temperatures;

3) Introducing the molten alloy into shape-forming mold; and

4) Quenching the molten alloy to temperatures below glass transition.

Upon the finishing of the above-mentioned fabrication method, the shaped metallic mechanical hook can be subjected further finishing operations, such as sharpening the tip, grinding, and polishing.

Bulk amorphous alloys retain their fluidity from above the melting temperature down to the glass transition temperature due to the lack of a first order phase transition. This is in direct contrast to conventional metals and alloys. Since, bulk amorphous alloys retain their fluidity, they do not accumulate significant stress from their casting temperatures down to below the glass transition temperature and as such dimensional distortions from thermal stress gradients can be minimized. Accordingly, metallic mechanical hooks with large surface area and small thickness can be produced cost-effectively.

Although specific embodiments are disclosed herein, it is expected that persons skilled in the art can and will design alternative amorphous alloy mechanical hooks and methods to produce the amorphous alloy mechanical hooks that are within the scope of the following claims either literally or under the Doctrine of Equivalents.

What is claimed is:

1. An engagement member formed from a bulk-solidifying amorphous alloy having an elastic strain limit of about 1.2% or more, comprising:
   a first portion formed from the bulk-solidifying amorphous alloy and having a first substantially circular cross section;
   a second portion formed from the bulk-solidifying amorphous alloy and having a second substantially circular cross section; and
   a third portion extending from an end of the first portion to an end of the second portion and having a substantially rectangular cross section, the third portion formed from the bulk-solidifying amorphous alloy.

2. The engagement member of claim 1, wherein the bulk-solidifying amorphous alloy has a glass transition temperature of 550° C. or above.

3. The engagement member of claim 1, wherein the bulk-solidifying amorphous alloy comprises a nickel-containing alloy.

4. The engagement member of claim 1, wherein the bulk-solidifying amorphous alloy comprises a ferrous alloy.

5. The engagement member of claim 1, wherein the bulk-solidifying amorphous alloy has a hardness of at least about 7.5 GPa.

6. The engagement member of claim 1, wherein the engagement member comprises an end with a sharpened tip.

7. A unitary hook-shaped member comprising a bulk-solidifying amorphous alloy having an elastic strain limit of about 1.2% or more, comprising:
   a first section formed from the bulk-solidifying amorphous alloy and having a first substantially circular cross section;
   a second section formed from the bulk-solidifying amorphous alloy and having a second substantially circular cross section; and
   a curved section formed from the bulk-solidifying amorphous alloy and extending from an end of the first section to an end of the second section, the curved section having a substantially rectangular cross section configured to resist bending of the second section with respect to the first section.

8. The hook-shaped member of claim 7, further comprising an end with a sharpened tip.

9. The hook-shaped member of claim 7, wherein the bulk-solidifying amorphous alloy has a glass transition temperature of 500° C. or above.

10. The engagement member of claim 1, further having a yield strength of 500 ksi or higher.

11. The hook-shaped member of claim 7,
    wherein a cross-sectional area of the substantially rectangular cross section is larger than a cross-sectional area of the first substantially circular cross section.

12. The hook-shaped member of claim 7,
    wherein the substantially rectangular cross section defines a long side and a short side; and
    the long side is substantially parallel to a bending plane formed by the first section and the second section.

13. The hook-shaped member of claim 11, wherein:
    the substantially rectangular cross section defines a long side and a short side; and
    the long side is substantially parallel to a bending plane formed by the first section and the second section.

14. An engagement member formed from a unitary bulk-solidifying amorphous alloy structure, comprising:
    a first substantially straight portion having a first substantially circular cross section;
    a curved portion joining the first substantially straight portion at a first end of the curved portion and having a substantially rectangular cross section; and
    a second substantially straight portion joining the curved portion at a second end of the curved portion and having a second substantially circular cross section.

15. The engagement member of claim 14, wherein a cross-sectional area of the second substantially straight portion is smaller than a cross-sectional area of the curved portion.

16. The engagement member of claim 15, wherein a cross-sectional area of the first substantially straight portion is smaller than the cross-sectional area of the second substantially straight portion and larger than the cross-sectional area of the curved portion.

17. The engagement member of claim 14, wherein a cross-sectional area of the curved portion is more than two times greater than a cross-sectional area of the first substantially straight portion.

18. The engagement member of claim 14, wherein the bulk-solidifying amorphous alloy has a hardness of at least about 7.5 GPa.

19. The engagement member of claim 14, wherein:
    the second substantially straight portion defines a tip of the engagement member; and
    the second substantially circular cross section tapers to a point at the tip of the engagement member.

20. The engagement member of claim 1, wherein:
    the end of the second portion is a first end;
    the second portion further comprises a second end defining a tip of the engagement member; and
    the second portion tapers from a first diameter at the first end to a second diameter smaller than the first diameter at the second end.

21. The hook-shaped member of claim 7, wherein a diameter of the second substantially circular cross section tapers to a point along a length of the second substantially circular cross section.

* * * * *